United States Patent
Pounds et al.

(10) Patent No.: US 10,228,691 B1
(45) Date of Patent: Mar. 12, 2019

(54) AUGMENTED RADAR CAMERA VIEW FOR REMOTELY OPERATED AERIAL VEHICLES

(71) Applicant: Olaeris, Inc, Fort Worth, TX (US)

(72) Inventors: Paul E. I. Pounds, Brisbane (AU); Edward Lindsley, Burelson, TX (US)

(73) Assignee: Olaeris, Inc., Burleson, TX (US)

( * ) Notice: Subject to any disclaimer, the term of this patent is extended or adjusted under 35 U.S.C. 154(b) by 0 days.

(21) Appl. No.: 15/475,143

(22) Filed: Mar. 31, 2017

Related U.S. Application Data (60) Provisional application No. 62/317,156, filed on Apr. 1, 2016.

(51) Int. Cl.
| | | |
|---|---|---|
| G05D 1/00 | (2006.01) | |
| G01S 7/00 | (2006.01) | |
| G01S 13/86 | (2006.01) | |
| G05D 1/10 | (2006.01) | |
| B64C 39/02 | (2006.01) | |
| B64D 47/08 | (2006.01) | |

(52) U.S. Cl.
CPC .......... G05D 1/0038 (2013.01); B64C 39/024 (2013.01); B64D 47/08 (2013.01); G01S 7/003 (2013.01); G01S 13/867 (2013.01); G05D 1/101 (2013.01); B64C 2201/108 (2013.01); B64C 2201/146 (2013.01)

(58) Field of Classification Search
CPC .............................. G05D 1/0028; B64C 39/02
See application file for complete search history.

(56) References Cited

U.S. PATENT DOCUMENTS

| | | | | |
|---|---|---|---|---|
| 6,694,228 B2* | 2/2004 | Rios | ..................... | G05D 1/0044 |
| | | | | 244/17.13 |
| 8,234,068 B1* | 7/2012 | Young | .................... | G01C 21/00 |
| | | | | 244/175 |
| 9,321,531 B1* | 4/2016 | Takayama | ................ | B64D 1/12 |
| 9,412,278 B1* | 8/2016 | Gong | .................... | H04L 63/101 |
| 9,551,990 B2* | 1/2017 | Heinonen | ................ | B64D 1/08 |
| 9,594,372 B1* | 3/2017 | Sills | ...................... | G05D 1/0011 |
| 9,630,712 B1* | 4/2017 | Carmack | ............... | B64C 39/024 |
| 9,678,506 B2* | 6/2017 | Bachrach | ............. | G05D 1/0016 |
| 9,773,421 B2* | 9/2017 | Wang | ................... | G08G 5/0078 |
| 2014/0158816 A1* | 6/2014 | DeLorean | .......... | B64C 29/0033 |
| | | | | 244/12.4 |

(Continued)

*Primary Examiner* — Alex C Dunn
(74) *Attorney, Agent, or Firm* — Michael B. Dodd; Dodd Law Group (57) ABSTRACT

The present invention extends to methods, systems, devices, and apparatus for augmented radar camera view for remotely operated vehicles. A camera and a radar unit are co-located on a remotely controlled aerial vehicle, for example, in a forward looking view. The camera captures images and the radar unit senses reflections from transmitted waves. The images (operator view) and radar returns (radar view) are combined in an augmented view. The augmented view is displayed to an operator (e.g., a pilot) at a control station to provide the operator with an augmented reality sense of obstacles in the environment of the remotely controlled aerial vehicle. Thus, when a remotely controlled aerial vehicle is flying through an environment that may be dark, clouded, foggy, etc., the operator may still be able to detect obstacles from the radar view.

13 Claims, 6 Drawing Sheets

(56) References Cited

U.S. PATENT DOCUMENTS

| | | | |
|---|---|---|---|
| 2014/0236390 A1* | 8/2014 | Mohamadi | B64C 19/00 701/2 |
| 2016/0378108 A1* | 12/2016 | Paczan | B64C 37/02 705/330 |
| 2017/0045807 A1* | 2/2017 | Ye | G03B 17/561 |
| 2017/0200311 A1* | 7/2017 | Pilskalns | G06T 19/003 |
| 2017/0274984 A1* | 9/2017 | Beckman | B64C 11/50 |
| 2018/0052472 A1* | 2/2018 | Cherepinsky | G08G 5/0086 |

\* cited by examiner

AUGMENTED RADAR CAMERA VIEW FOR REMOTELY OPERATED AERIAL VEHICLES

CROSS-REFERENCE TO RELATED APPLICATIONS

This application claims the benefit of and priority to U.S. Provisional Patent Application Ser. No. 62/317,156 entitled "Gimbal Stabilized Components For Remotely Operated Aerial Vehicles And Augmented Radar Camera View For Remotely Operated Aerial Vehicles", filed Apr. 1, 2016 by Paul E. I. Pounds et al., the entire contents of which are expressly incorporated by reference.

BACKGROUND

1. Background and Relevant Art

The number of remotely operated (e.g., piloted) aerial vehicles, including unmanned aerial vehicles (UAVs), being flown continues to increase. A variety of different entities including hobbyists, delivery companies, intelligence agencies, surveyors, power companies, etc. use Remotely Operated Aerial Vehicles. Some Remotely Operated Aerial Vehicles operate past line of sight. On an ongoing basis and/or at a destination, the Remotely Operated Aerial Vehicle provides images and/or video of its surroundings back to a monitoring system (which may or may not be the location of the operator). The Remotely Operated Aerial Vehicle can also perform other activities, such as, delivering a package. Hobbyists typically use UAVs within line of sight as a recreational activity. These UAVs may or may not provide images and/or video back to the operator.

In most operating environments, a Remotely Operated Aerial Vehicle can be launched from a launch location accessible to the operator (e.g., hobbyist or pilot) and/or maintenance personnel. The Remotely Operated Aerial Vehicle is flown for some amount of time or to complete a specified mission. The Remotely Operated Aerial Vehicle is then flown to a landing location (which may or may not be the same as the launch location) and lands.

Some Remotely Operated Aerial Vehicles may also operate autonomously and/or in communication with a computer system. For example, a Remotely Operated Aerial Vehicle can be programmed to follow a designated path between different sets of coordinates. In some environments, a standby pilot can monitor a Remotely Operated Aerial Vehicle during autonomous or computer controlled flight. When appropriate (e.g., due to component failures, weather conditions, etc.), the pilot can disrupt autonomous flight and assume control of the Remotely Operated Aerial Vehicle. As such, the pilot may be able to safely land a Remotely Operated Aerial Vehicle when autonomous or computer controlled flight has become unsafe.

BRIEF SUMMARY

The present invention extends to methods, systems, devices, apparatus, and computer program products for augmented radar camera view for remotely operated vehicles. A camera and a radar unit are co-located on a remotely controlled aerial vehicle, for example, in a forward looking view. The camera captures images and the radar unit senses reflections from transmitted waves. The images (operator view) and radar returns (radar view) are combined in an augmented view.

The augmented view is provided to an operator (e.g., a pilot) at a control station. As such, the operator (e.g., pilot) has an augmented reality sense of obstacles in the environment of the remotely controlled aerial vehicle. Obstacles detected with the radar unit can be superimposed on an operator's forward looking view derived from the camera images. Thus, when a remotely controlled aerial vehicle is flying through an environment that may be dark, clouded, foggy, etc., the operator (e.g., pilot) may still be able to detect obstacles from the radar view.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

The specific features, aspects and advantages of the present invention will become better understood with regard to the following description and accompanying drawings where.

DETAILED DESCRIPTION

The present invention extends to methods, systems, devices, apparatus, and computer program products for augmented radar camera view for remotely operated vehicles. A camera and a radar unit are co-located on a remotely controlled aerial vehicle, for example, in a forward looking view. The camera captures images and the radar unit senses reflections from transmitted waves. The images (operator view) and radar returns (radar view) are combined in an augmented view.

The augmented view is provided to an operator (e.g., a pilot) at a control station. As such, the operator (e.g., pilot) has an augmented reality sense of obstacles in the environment of the remotely controlled aerial vehicle. Obstacles detected with the radar unit can be superimposed on a pilots forward looking view derived from the camera images. Thus, when a remotely controlled aerial vehicle is flying through an environment that may be dark, clouded, foggy, etc., the operator (e.g., pilot) may still be able to detect obstacles from the radar view.

Thus, aspects of the invention combine output from a camera with radar detections to improve obstacle detection and avoidance for a Remotely Operated Aerial Vehicle during flight. In some aspects, a Remotely Operated Aerial Vehicle is a Remotely Piloted Aircraft (RPA) (and is potentially unnamed, for example, an Unmanned Aerial Vehicle (UAV)). In some aspects, a remotely operated aerial vehicle is a rotor-based UAV that includes a plurality of rotors. In some aspects, a rotor-based UAV is a quad-rotor UAV. In other aspects, a rotor-based UAV includes five or more rotors. A rotor-based UAV can use rotors for one or more of: lift, maneuvering, and to change orientation.

In this description and the following claims, "radar" is defined as an object-detection system that uses radio waves to determine one or more of range, angle, or velocity of objects. Radar operates using a transmit component and receive component. The transmit component and receive component may or may not be physically located within the same radar system. A transmit component transmits radio waves or microwaves that reflect from any object in their path. A receive component receives and processes these reflected waves to determine properties of the object(s).

In this description and the following claims, a "radar unit" is defined as any combination of one or more components that implements the principles of radar. A radar unit can include hardware components (digital and/or analog) and software components for transmitting radio waves or microwaves and receiving and processing reflections from the radio waves or microwaves. A radar unit can also include hardware and/or software components for interfacing with other components at a Remotely Operated Aerial Vehicle, such as, for example, processors, system memory, communication modules (e.g., network interface cards, modems, etc.), etc. As such, a radar unit can receive input (e.g., operating commands) from and provide output (e.g., reflection information, status information, etc.) to the other components at the Remotely Operated Aerial Vehicle.

In this description and the following claims, "lidar" is defined as an object-detection system that uses light to determine one or more of range, angle, or velocity of objects. Lidar operates using a transmit component and receive component. The transmit component and receive component may or may not be physically located within the same lidar system. A transmit component transmits light that reflects from any object in its path. A receive component receives and processes the reflected light to determine properties of the object(s).

In this description and the following claims, a "lidar unit" is defined as any combination of one or more components that implements the principles of lidar. A lidar unit can include hardware components (digital and/or analog) and software components for transmitting light and receiving and processing light reflections. A lidar unit can also include hardware and/or software components for interfacing with other components at a Remotely Operated Aerial Vehicle, such as, for example, processors, system memory, communication modules (e.g., network interface cards, modems, etc.), etc. As such, a lidar unit can receive input (e.g., operating commands) from and provide output (e.g., reflection information, status information, etc.) to the other components at the Remotely Operated Aerial Vehicle.

In this description and the following claims, a "camera" is defined as an optical instrument for recording images, which may be stored locally, transmitted to another location, or both. The images may be individual still photographs or sequences of images comprising videos or movies.

In this description and in the following claims, a "gimbal" is defined as a pivoted support that allows the rotation of an object about a single axis. A set of three gimbals, one mounted on the other with orthogonal pivot axes, may be used to allow an object mounted on the innermost gimbal to remain independent of the rotation of its support (e.g. vertical in the first animation). For example, on a ship, the gyroscopes, shipboard compasses, stoves, and even drink holders typically use gimbals to keep them upright with respect to the horizon despite the ship's pitching and rolling. A gimbal can include hardware and/or software components for interfacing with other components at a Remotely Operated Aerial Vehicle, such as, for example, processors, system memory, communication modules (e.g., network interface cards, modems, etc.), etc. As such, a gimbal can receive input (e.g., commands for changing orientation) from and provide output (e.g., status information) to the other components at the Remotely Operated Aerial Vehicle.

In this description and the following claims, "optical flow" is defined as the pattern of apparent motion of objects, surfaces, and edges in a visual scene caused by the relative motion between an observer (e.g., an eye or a camera) and the scene. Optical flow. Optical flow includes related techniques from image processing and control of navigation including motion detection, object segmentation, time-to-contact information, focus of expansion calculations, luminance, motion compensated encoding, and stereo disparity measurement.

In this description and the following claims, an "optical flow unit" is defined as any combination of one or more components that implements the principles of optical flow. An optical flow unit can include hardware and/or software components for interfacing with other components at a Remotely Operated Aerial Vehicle, such as, for example, processors, system memory, communication modules (e.g., network interface cards, modems, etc.), etc. As such, an optical flow unit can receive input (e.g., operating commands) from and provide output (e.g., sensed motion, etc.) to the other components at the Remotely Operated Aerial Vehicle.

For example, an optical flow unit can include an optical flow sensor capable of measuring optical flow or visual motion and outputting a measurement based on optical flow. Various configurations of optical flow sensors exist. One configuration is an image sensor chip connected to a processor programmed to run an optical flow algorithm. Another configuration uses a vision chip, which is an integrated circuit having both the image sensor and the processor on the same die, allowing for a compact implementation. An example of this is a generic optical mouse sensor used in an optical mouse. In some aspects, the processing circuitry may be implemented using analog or mixed-signal circuits to enable fast optical flow computation using minimal current consumption.

Optical flow sensors can be used to measure visual motion or relative motion between a Remotely Operated Aerial Vehicle and other objects in the vicinity of the Remotely Operated Aerial Vehicle t (e.g., for obstacle detection and avoidance).

In this description and the following claims, "simultaneous localization and mapping (SLAM)" is defined as constructing or updating a map of an unknown environment while simultaneously keeping track of an agent's location within it. SLAM algorithms can be tailored to the available resources, hence not aimed at perfection, but at operational compliance.

In this description and the following claims, "SLAM vision" is defined as using the principles of SLAM for obstacle detection and avoidance.

In this description and the following claims, a "SLAM vision unit" is defined as any combination of one or more components that implement the principles of SLAM to implementation SLAM vision. A SLAM vision unit can include hardware and/or software components for interfacing with other components at a Remotely Operated Aerial Vehicle, such as, for example, processors, system memory, communication modules (e.g., network interface cards, modems, etc.), etc. As such, a SLAM vision unit can receive input (e.g., operating commands) from and provide output (e.g., sensed motion, environment, etc.) to the other components at the Remotely Operated Aerial Vehicle.

A SLAM vision unit can use several different types of sensors. Different types of sensors give rise to different SLAM algorithms whose assumptions are more appropriate to the sensors. On one hand, laser scans or visual features provide details of a great many points within an area, sometimes rendering SLAM inference unnecessary because shapes in these point clouds can be easily and unambiguously aligned at each step via image registration. On the other hand, tactile sensors are extremely sparse as they contain only information about points very close to the agent, so they require strong prior models to compensate in purely tactile SLAM. Most practical SLAM tasks fall somewhere between these visual and tactile implementations.

Sensor models can divide into landmark-based and raw-data approaches. Landmarks are uniquely identifiable objects in the world whose location can be estimated by a sensor, such as, Wi-Fi access points or radio beacons. Raw-data approaches make no assumption that landmarks can be identified, and instead model $P(o_t|x_t)$ directly as a function of the location.

Optical sensors may be one-dimensional (single beam) or two-dimensional (sweeping) laser rangefinders, three-dimensional High Definition LiDAR, three-dimensional Flash LIDAR, two-dimensional or three-dimensional sonar sensors and one or more two-dimensional cameras. VSLAM (visual SLAM) can used with (camera) sensors Visual and LIDAR sensors can be informative enough to allow for landmark extraction in many cases. Other forms of SLAM include tactile SLAM (sensing by local touch only), radar SLAM, and Wi-Fi-SLAM (sensing by strengths of nearby Wi-Fi access points). Quasi-optical wireless ranging for multi-lateration (RTLS) or multi-angulation can be used in conjunction with SLAM as a tribute to erratic wireless measures.

In this description and the following claims, "Automatic Dependent Surveillance-Broadcast (ADS-B)" is defined as surveillance technology in which an aircraft determines its position via satellite navigation and periodically broadcasts it, enabling it to be tracked. The position information can be received by air traffic control ground stations as a replacement for secondary radar. It can also be received by other aircraft to provide situational awareness and allow self separation.

In this description and the following claims, "an ADS-B unit" is defined as any combination of one or more components that implements the principles of ADS-B. ADS-B can include hardware and/or software components for interfacing with other components at a Remotely Operated Aerial Vehicle, such as, for example, processors, system memory, communication modules (e.g., network interface cards, modems, etc.), etc. An ADS-B unit can receive position data from a Remotely Operated Aerial Vehicle's navigation system and output a position abased on the position data.

A. Augmented Radar Camera View for Remotely Operated Aerial Vehicles

Figure 1A:
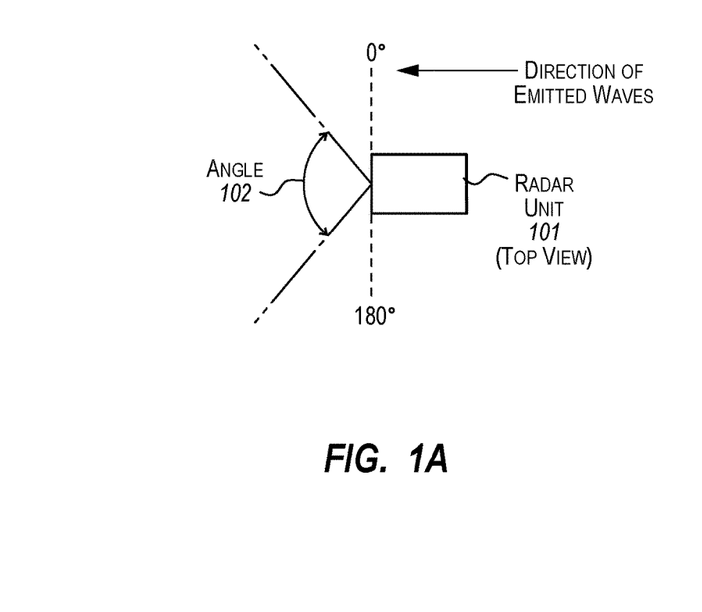
FIG. 1A illustrates a top view of an example radar unit.
Figure 1B:
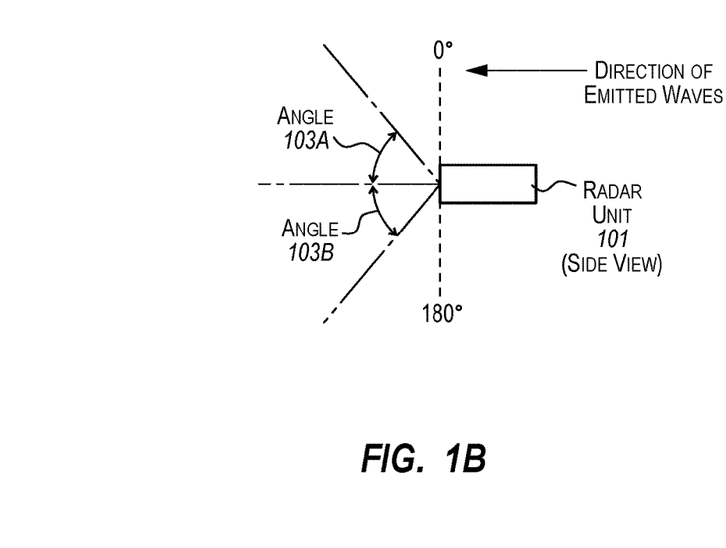
FIG. 1B illustrates a side view of an example radar unit.

Turning to FIGS. 1A and 1B, FIGS. 1A and 1B depict an example radar unit 101. Radar unit 101 can be a forward looking radar. Radar unit 101 can be configured to detect objects within a defined lateral field of view (azimuth). FIG. 1A illustrates a top view of radar unit 101. Angle 102 represents a lateral field of view (azimuth) for radar unit 101. In one aspect, angle 102 is between 100-120 degrees. Thus, for example, when angle 102 is 100 degrees, radar unit 101 can detect objects that are at angles between 40 and 140 degrees relative to the front radar unit 101. Similarly, for example, when angle 102 is 120 degrees, radar unit 101 can detect objects that are at angles between 30 and 150 degrees relative to the from radar unit 101.

Radar unit 101 can also be configured to detect objects within a defined angle of elevation. Optionally, radar unit 101 can be configured to detect objects with a defined angle of elevation and a defined angle of depression together. FIG. 1B illustrates a side view of radar unit 101. Angle 103A represents an angle of elevation field of view of radar unit 101. Similarly, angle 103B represents an optional angle of depression field of view of radar unit 101. In one aspect, the angle 103A is between 15-20 degrees. In another aspect, both angle 103A and angle 103B are between 15-20 degrees. However, angle 103A and 103B can differ.

As such, depending on the distance from radar unit 101, radar unit 101 can detect objects within a defined azimuth range and elevation range (and optionally depression range) based on angle 102, angle 103A (and optionally angle 103B).

Figure 2:
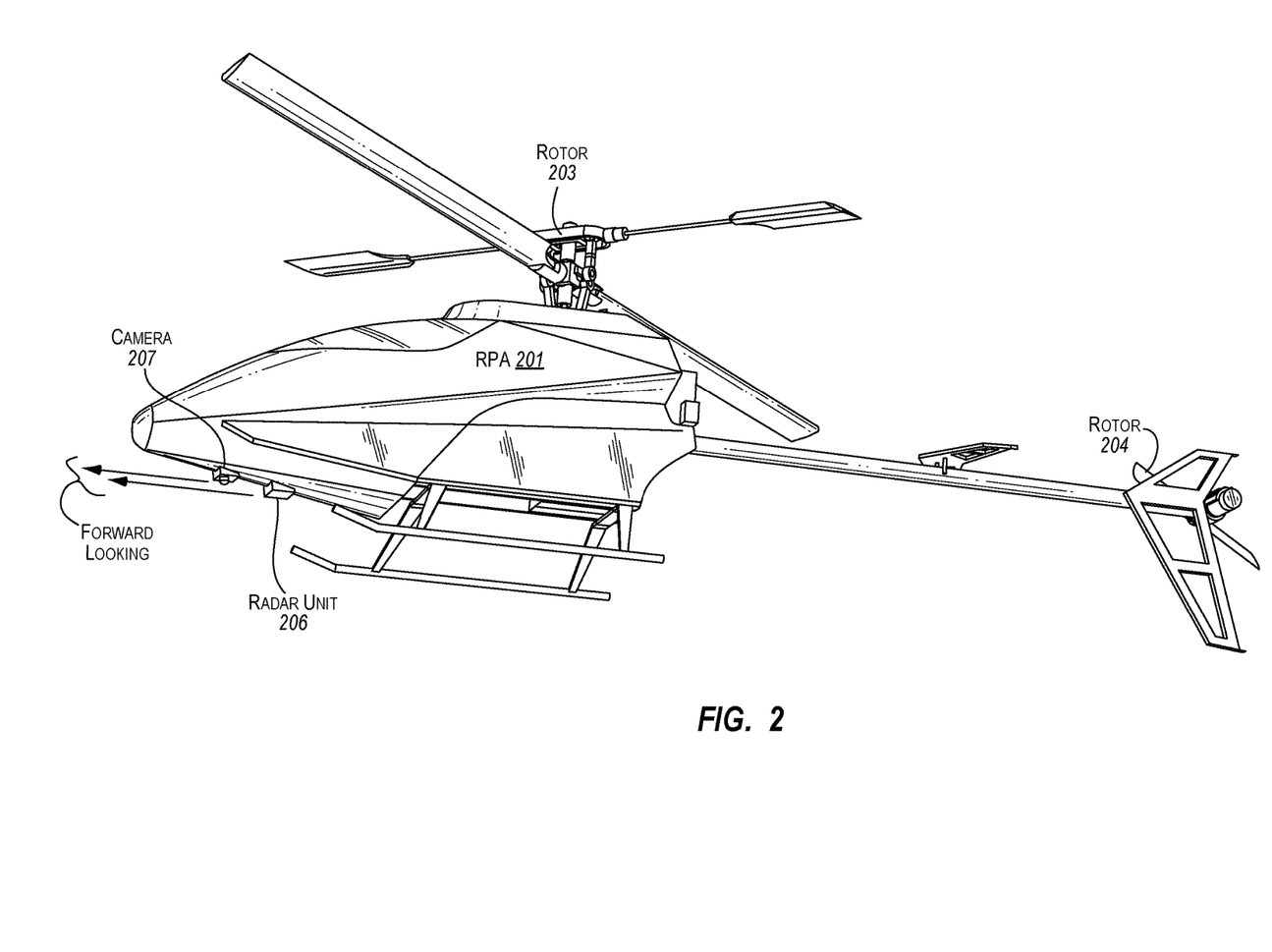
FIG. 2 illustrates an example Remotely Piloted Aircraft (RPA)

Turning to FIG. 2, FIG. 2 illustrates example Remotely Piloted Aircraft (RPA) 201. Remotely Piloted Aircraft (RPA) 201 includes radar unit 206, camera 207, and rotors 203 and 204. Remotely Piloted Aircraft (RPA) 201 can be flying in the air under the control of a pilot (or other operator) on the ground. As depicted, both radar unit 206 and camera 207 are forward looking. The angles of elevation (and possibly also angels of depression) and azimuths for radar unit 206 and camera 207 can be similar. As such, radar unit 206 and camera 207 essentially "view" the same area in front of Remotely Piloted Aircraft (RPA) 201 during flight.

Figure 3:
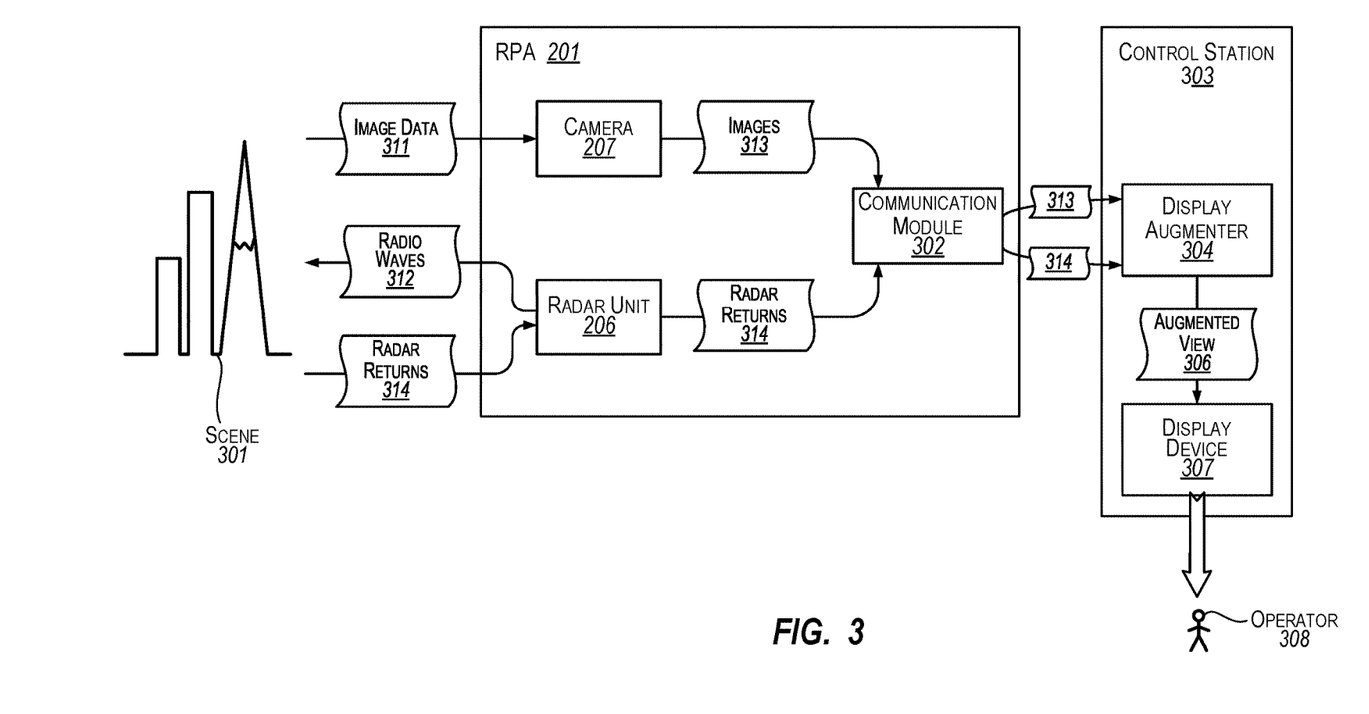
FIG. 3 illustrates example components of the Remotely Piloted Aircraft (RPA) and a control station.

Turning to FIG. 3, FIG. 3 illustrates example components of the Remotely Piloted Aircraft (RPA) 201 and a control station 303. As depicted in FIG. 3, radar unit 206 and camera 207 are "viewing" scene 301. Scene 301 can be a landscape in front of Remotely Piloted Aircraft (RPA) 201 during flight. The landscape can include buildings, mountains, and other obstacles. Camera 207 can capture image data 311 and transform image data 311 into images 313 (e.g., a video feed in the visual light spectrum of the space in front of Remotely Piloted Aircraft (RPA) 201). Radar unit 206 can transmit radio waves 312 into scene 301 and pick up radar returns 314 (reflections of radio waves 312). Radar returns 314 can be a radar feed of the space in front of Remotely Piloted Aircraft (RPA) 201.

Camera 207 can send images 313 to communication module 302. Similarly, radar unit 206 can send radar returns 314 to communication module 302. Communication module 302 can send images 313 and radar returns 314 (e.g., via a wireless network) to control station 303. Control station 303 can be a ground based station used by operator 308 (e.g., a pilot) to remotely control (e.g., via the wireless network) Remotely Piloted Aircraft (RPA) 201.

Images 313 and radar returns 314 can be received at display augmenter 304. Display augmenter 304 (e.g., one or more processors, system memory, circuitry, analog components, electronic components, digital components, ASICs, FPGAs, etc.) can augment images 313 with corresponding radar returns 314 to transform images 313 and radar returns 314 into augmented view 306. Augmented view 306 can be displayed to operator 308 at display device 307. Augmented view 306 can increase the likelihood of detecting and avoiding obstacles (e.g., in scene 301) when Remotely Piloted Aircraft (RPA) 201 is flying in reduced visibility environments.

Aspects of the invention also include collocating a camera with some other type of sensor, such as, for example, a lidar unit, an optical flow unit, a SLAM vision unit, an ADS-B unit, etc. In these aspects, data from the other type of sensors, such as, for example, lidar returns, etc., can be used to augment images from a camera. Cameras may operate in spectrums other than the visible light spectrum (e.g., infrared, thermographic, ultraviolet, etc.)

B. Gimbal Stabilized Components for Remotely Operated Aerial Vehicles

Other aspects include methods, systems, devices, apparatus, and computer program products for gimbal stabilized components for remotely operated vehicles. Aspects of the invention include a gimbal stabilized radar system. A radar unit is mounted on a vertical (or horizontal) gimbal attached to a remotely operated aerial vehicle. In aspects, a radar unit is mounted to a gimbal having multiple degrees of freedom. When the remotely operated aerial vehicle rotates and/or changes its orientation in space, the gimbal compensates keeping the direction and elevation (and/or depression) angle of the radar essentially constant.

Thus, aspects of the invention use a gimbal to maintain radar direction and elevation angle for a radar unit mounted on a Remotely Operated Aerial Vehicle.

Figure 4A:
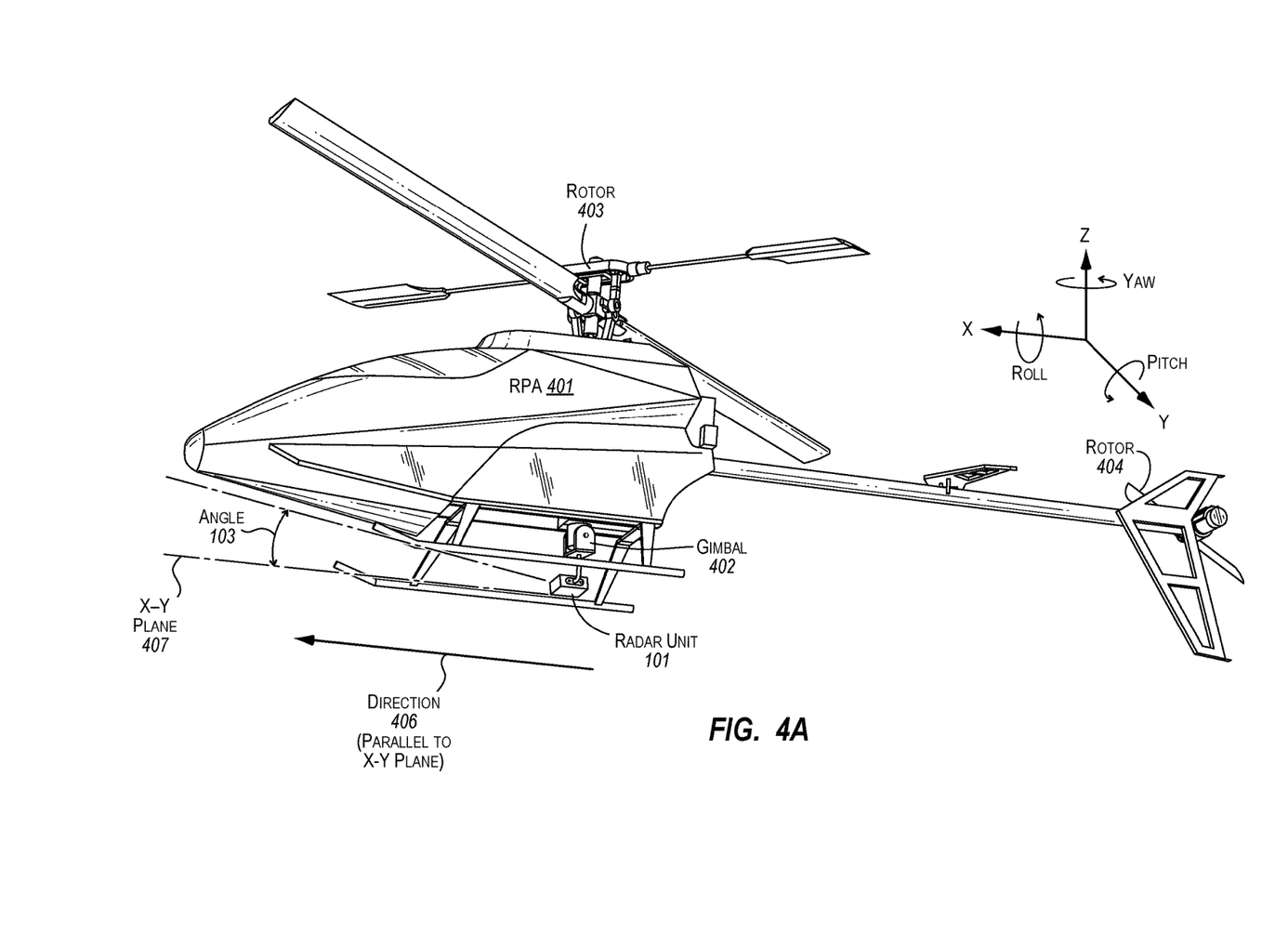
FIGS. 4A and 4B illustrate another example Remotely Piloted Aircraft (RPA).

Turning to FIG. 4A, FIG. 4A illustrates an example Remotely Piloted Aircraft (RPA) 401. Remotely Piloted Aircraft (RPA) 401 includes gimbal 402 and rotors 403 and 404. Remotely Piloted Aircraft (RPA) 401 can be flying in the air under the control of a pilot (or other operator) on the ground. As depicted, radar unit 101 is mounted to gimbal 402. Angle of elevation 103 is also depicted. In FIG. 4A, Remotely Piloted Aircraft (RPA) 401 is flying in direction 406 parallel to the X-Y plane, for example, the ground. That is, Remotely Piloted Aircraft (RPA) 401 is neither ascending nor descending. In FIG. 4A, the pitch of Remotely Piloted Aircraft (RPA) 401 can also be zero degrees relative to the X-Y plane 407.

In response to commands from the pilot (or other operator), Remotely Piloted Aircraft (RPA) 401 can implement a maneuver that changes the orientation of Remotely Piloted Aircraft (RPA) 401 but not the direction of flight. For example, in response to a command to decelerate, Remotely Piloted Aircraft (RPA) 401 can change pitch somewhat in the positive Z direction. Essentially simultaneously with change in pitch, gimbal 402 can compensate for the change in pitch to maintain angle 103 relative to X-Y plane 407.

Figure 4B:
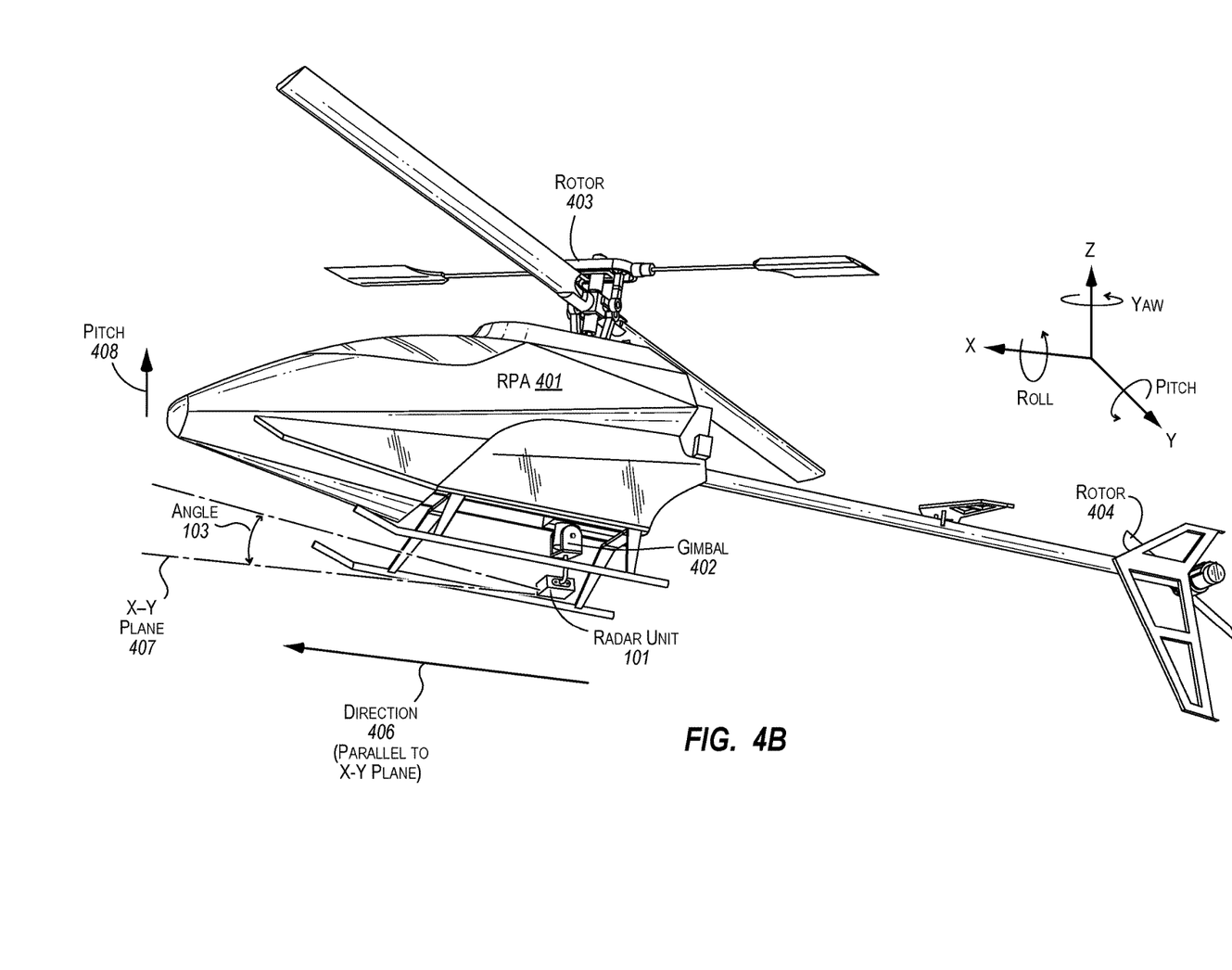

Turning to FIG. 4B, FIG. 4B illustrates Remotely Piloted Aircraft (RPA) 401. In FIG. 4B, the front end of Remotely Piloted Aircraft (RPA) 401 is pitched up (the positive Z direction) in accordance with pitch 408. Pitch 408 can represent some angle above the X-Y plane relative to the center of mass of Remotely Piloted Aircraft (RPA). However, Remotely Piloted Aircraft (RPA) 401 continues to fly in direction 406. Gimbal 402 has compensated for pitch 408 to maintain angle 103 essentially the same relative to X-Y plane 407.

Accordingly, FIGS. 4A and 4B illustrate an example of using a gimbal to compensate for a change in pitch to maintain an essentially constant angle of elevation (and/or depression) for a radar unit. A gimbal can also be used to compensate for a change in roll or yaw to maintain an essentially constant angle of elevation (and/or depression) for a radar unit. A gimbal can also be used to compensate for a change in pitch, roll, or yaw to maintain an essentially constant angle of direction for a radar unit.

Gimbals with multiple degrees of freedom can be used to compensate for changes in two or more of pitch, roll, and yaw to maintain an essentially constant angle of elevation (and/or depression) for a radar unit. Gimbals with multiple degrees of freedom can also be used to compensate for changes in two or more of pitch, roll, or yaw to maintain an essentially constant angle of direction for a radar unit. Gimbals can also be used to compensate for changes in two or more of pitch, roll, and yaw to maintain both an essentially constant angle of elevation (and/or depression) and a essentially constant angle of direction for a radar unit.

In one aspect, a gimbal controller (e.g., a processor, other digital components, and/or analog components and corresponding software) is included in Remotely Piloted Aircraft (RPA) 401. The gimbal controller controls gimbal 402 in response to detected (or anticipated) changes in the orientation of Remotely Piloted Aircraft (RPA) 401 based on pilot (or other operator) commands. For example, a pilot or other operator can input commands to other components at Remotely Piloted Aircraft (RPA) 401 (e.g., throttle, ailerons, rudder, elevators, rotors, etc.) that cause changes in one or more of: pitch, yaw, and roll of Remotely Piloted Aircraft (RPA) 401. The gimbal controller controls gimbal 402 to compensate for the changes in one or more of: pitch, yaw, and roll to maintain an essentially constant angle of elevation (and/or depression) and/or an essentially constant angle of direction for radar unit 101.

Figure 5:
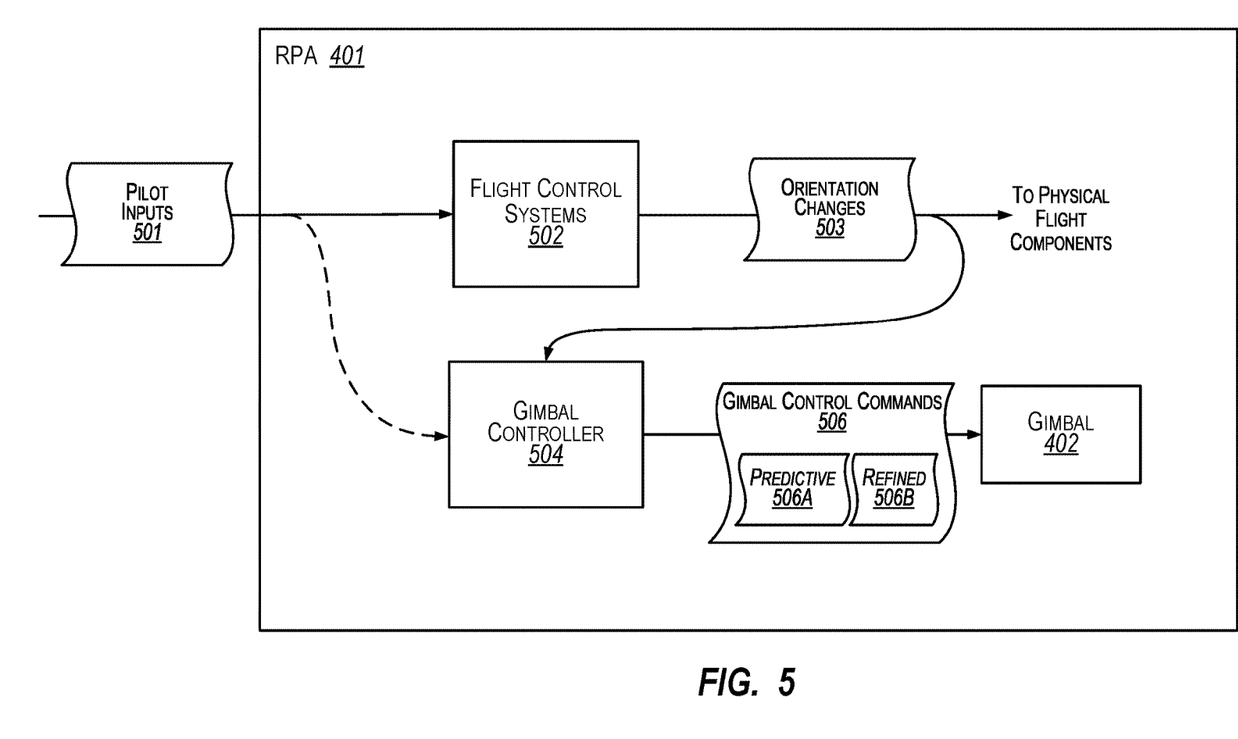
FIG. 5 illustrates example components of the other Remotely Piloted Aircraft (RPA).

For example, turning to FIG. 5, Remotely Piloted Aircraft (RPA) 401 can include flight control systems 502 (e.g., one or more processors, system memory, circuitry, analog components, electronic components, digital components, ASICs, FPGAs, etc.). Flight control systems 502 can receive pilot inputs 501. Pilot inputs 501 can include commands for changing the orientation of Remotely Piloted Aircraft (RPA) 401. Flight control systems 502 can transform pilot input 501 into orientation changes 503. Physical flight components (e.g., throttle, ailerons, rudder, elevators, rotors, etc.) can implement orientation changes 503 to change the orientation of Remotely Piloted Aircraft (RPA) 401. Orientation changes 503 can be implemented through manipulation of the physical flight components to change one or more of: pitch, yaw, and roll.

Gimbal controller 504 can derive gimbal control commands 506 for reorienting gimbal 402. Gimbal control commands can include one or more of: predictive gimbal control commands 506A and refined gimbal control commands 306B.

Gimbal controller 504 can access orientation changes 503. Gimbal controller 504 (e.g., one or more processors, system memory, circuitry, analog components, electronic components, digital components, ASICs, FPGAs, etc.) can process orientation changes to derive gimbal control commands 506. Gimbal controller 504 can send gimbal control commands 506 to gimbal 402. Gimbal control commands 506 can change the orientation of gimbal 402 to compensate for orientation changes 503 to maintain an essentially constant angle of elevation (and/or depression) and/or a an essentially constant angle of direction for radar unit 101.

In one aspect, gimbal controller 504 accesses pilot input 501. Gimbal controller 504 can process pilot input 501 to predict gimbal control commands 506.

For example, gimbal controller 504 derives (or formulates) predictive gimbal control commands 506A in advance of one or more anticipated orientation changes at Remotely Piloted Aircraft (RPA) 401 (e.g., in advance of orientation changes 503). Gimbal controller 504 sends predictive gimbal control commands 506A to gimbal 402. Predictive gimbal control commands 506A change the orientation of gimbal 502 to (pre)compensate for the one or more anticipated orientation changes at Remotely Piloted Aircraft (RPA) 501.

Gimbal controller 504 subsequently derives (or formulates) refined gimble control commands 506B from orientation changes 503. Gimbal controller 504 sends refined gimbal control commands 506B to gimbal 402. Refined gimble control commands 506B change (refine) the orientation of gimbal 502 to compensate for orientation changes 503 at Remotely Piloted Aircraft (RPA) 401.

Predictive gimbal control commands 506A may be less precise than refined gimble control commands 506B. Accordingly, gimbal controller 504 can make advance, but possibly less precise changes, in the orientation of gimbal 402. The advance changes can be subsequently refined (possibly after orientation changes 503 are implemented to change the orientation of Remotely Piloted Aircraft (RPA) 401) with more precise changes to the orientation of gimbal 402.

Aspects of the invention also include changing the orientation of a gimbal to compensate for changes (and/or anticipated changes) in orientation of a remotely operated aerial vehicle to maintain angles, directions, positions, etc. for other types of components, such as, for example, cameras (visible light, infrared, thermographic, ultraviolet), lidar units, optical flow units, SLAM vision units, ADS-B units, etc., mounted to the gimbal.

Aspects of the invention also include mounting multiple components to a gimbal. The multiple components can be two or more of the same component, such as, for example, two or more radar units. Alternately, the multiple components can include different types of components, such as, for example, a radar unit and a camera. Other combinations are also possible. The orientation of a gimbal can be changed to compensate for changes in orientation of a remotely operated aerial vehicle to maintain angles, positions, etc. for multiple components to the extent possible. The resulting angles, positions, etc. may be approximate but better than if the gimbal was not reoriented at all.

Aspects include using multiple gimbals with the same or different mounted sensors. A gimbal controller (or gimbal controllers) can individually compensate for orientation changes in a remotely operated aerial vehicle to maintain angles, positions, etc. for corresponding sensors.

Aspects of the invention also include sensors implementing optical flow vision or SLAM vision, as well as the ADS-B transponder. A stabilized gimbal can have radar and cameras facing forward and on the rear another gimbal for 360 degree Lidar plus rear facing cameras.

C. Combined Implementations

Some or all of different aspects of the invention can be used and/or integrated to together to further enhance operation of remotely controlled aerial vehicles. For example, in one aspect a camera and radar unit can be co-located on the same gimbal attached to a remotely controlled aerial vehicle. The gimbal can be reoriented in anticipation of and/or in response to a change in orientation of the remotely controlled aerial vehicle to maintain angles and positioning for the camera and the radar unit.

An augmented forward looking view for the remotely controlled aerial vehicle can be presented to an operator (e.g., pilot) of the remotely controlled aerial vehicle. The augmented forward looking view can be created by augmenting images from the camera with radar returns from the radar unit. Augmenting can include superimposing the radar returns onto the images to transform the received images and the received radar returns into the augmented forward looking view for the remotely controlled aerial vehicle.

In another aspect, a camera is mounted on a gimbal attached to a remotely controlled aerial vehicle. A radar unit is mounted on another co-located gimbal attached to the remotely controlled aerial vehicle. The gimbal and the other gimbal can be independently reoriented. The gimbal can be reoriented in anticipation of and/or in response to a change in orientation of the remotely controlled aerial vehicle to maintain angles and positioning for the camera. The other gimbal can be reoriented in anticipation of and/or in response to a change in orientation of the remotely controlled aerial vehicle to maintain angles and positioning for the radar unit. As described, an augmented forward looking view for the remotely controlled aerial vehicle can be created and presented to an operator (e.g., pilot) based on images and radar returns.

In general, analog and/or digital systems can be used to monitor and control remotely operated aerial vehicles. Monitoring and control equipment can be co-located with and/or separate one another. Information exchanged between remotely operated aerial vehicles and monitoring and control equipment can be relayed over wired and/or wireless communication networks.

Remotely operated aerial vehicles can include computer network connectivity components (e.g., a Network Interface Card ("NIC") or cellular modem) for wired or wirelessly connecting the monitoring equipment to a computer network. As such, modules, algorithms, components, etc., for augmenting images with other sensor data can also be connected to other modules, algorithms, components, etc., over (or be part of) a network, such as, for example, a Local Area Network ("LAN"), a Wide Area Network ("WAN"), and even the Internet. Accordingly, the modules, algorithms, components, etc., for augmenting images with other sensor data as well as any other connected computer systems and their components (e.g., in a control or command center), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Similarly, modules, algorithms, components, etc., for maintaining an essentially constant angle of elevation (and/or depression) and/or an essentially constant angle of direction for sensors at remotely operated aerial vehicles can also be connected to other modules, algorithms, components, etc., over (or be part of) a network, such as, for example, a Local Area Network ("LAN"), a Wide Area Network ("WAN"), and even the Internet. Accordingly, the modules, algorithms, components, etc., for maintaining an essentially constant angle of elevation (and/or depression) and/or an essentially constant angle of direction for sensors at remotely operated aerial vehicles as well as any other connected computer systems and their components (e.g., in a control or command center), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Aspects of the present invention may comprise or utilize a special purpose or general-purpose computer including computer hardware, such as, for example, one or more processors and system memory, as discussed in greater detail below. Aspects within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, Aspects of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Aspects of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, between any of: image data, images, radio waves, radar returns, augmented views, pilot inputs, orientation changes, gimbal control commands, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, image data, images, radio waves, radar returns, augmented views, pilot inputs, orientation changes, gimbal control commands, etc.

The described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A computer implemented method comprising:
receiving images recorded by a forward facing camera mounted to a remotely controlled aerial vehicle;
receiving radar returns detected by a forward facing radar unit mounted to the remotely controlled aerial vehicle and co-located with the forward facing radar unit;
superimposing the received radar returns onto the received images to transform the received images and the received radar returns into an augmented forward looking view from the perspective of remotely controlled aerial vehicle;
displaying the augmented forward looking view to an operator of the remotely controlled aerial vehicle at a display device; and
sending instructions instructing the remotely operated aerial vehicle to change orientation based on an object displayed in the augmented forward looking view.

2. The method of claim 1, wherein the remotely controlled aerial vehicle is an unmanned aerial vehicle, the unmanned aerial vehicle including a plurality of rotors.

3. The method of claim 1, wherein receiving images recorded by the forward facing camera comprises receiving images recorded by a forward facing camera mounted to a gimbal attached to the remotely controlled aerial vehicle; and
wherein receiving radar returns detected by the forward facing radar unit comprises receiving radar returns detected by a forward facing radar unit co-mounted to the gimbal.

4. The method of claim 1, wherein receiving images recorded by the forward facing camera comprises receiving images recorded by a forward facing camera mounted to a gimbal attached to the remotely controlled aerial vehicle; and
wherein receiving radar returns detected by the forward facing radar unit comprises receiving radar returns detected by a forward facing radar unit mounted to another gimbal attached to the remotely controlled aerial vehicle, the gimbal and the other gimbal co-located at the remotely controlled aerial vehicle.

5. A remotely controlled aerial vehicle, the remotely controlled aerial vehicle comprising:
one or more processors;
system memory coupled to the one or more processors, the system memory storing instructions;
a gimbal
a forward facing camera mounted on the gimbal;
a forward facing sensor co-located with the forward facing camera;
a gimbal controller configured to predict and/or detect changes in orientation of the remotely controlled aerial vehicle and to generate predictive gimbal control commands in response to predicting the changes in orientation of the remotely controlled aerial vehicle and refined gimbal control commands in response to detecting the changes in orientation of the remotely controlled aerial vehicle, wherein the gimbal controller is further configured to control the gimbal in accordance with the predictive gimbal control commands and the refined gimbal control commands; and the one or more processors executing the instructions to:
use the forward facing camera to obtain images from an area in front of the remotely controlled aerial vehicle
use the forward facing sensor to obtain sensor data from the area; and
send the images and the sensor data to a control station used to control the remotely controlled aerial vehicle for use in creating and displaying an augmented forward looking view for the area, creating the augmented forward looking view including augmenting the images with the sensor data by superimposing the sensor data onto the images to transform the images and the sensor data into the augmented forward looking view for the area, displaying the augmented forward looking view including display the augmented forward looking at a display device of the control station.

6. The remotely controlled aerial vehicle of claim 5, wherein the remotely controlled aerial vehicle is an unmanned aerial vehicle, the unmanned aerial vehicle including a plurality of rotors.

7. The remotely controlled aerial vehicle of claim 5, wherein the forward facing sensor is a forward facing radar unit.

8. The remotely controlled aerial vehicle of claim 5, wherein the one or more processors executing the instructions to use the forward facing sensor to obtain sensor data from the area comprises the one or more processors executing the instructions to use the forward facing radar unit to obtain radar returns from the area.

9. The remotely controlled aerial vehicle of claim 8, wherein the one or more processors executing the instructions to send the images and the sensor data to a control station used to control the remotely controlled aerial vehicle comprises the one or more processors executing the instructions to send the images and the radar returns to the control station.

10. The remotely controlled aerial vehicle of claim 5, further comprising a gimbal, and wherein the forward facing camera and the forward facing sensor are co-located on the gimbal.

11. A computer system, the computer system comprising one or more processors;
system memory coupled to the one or more processors, the system memory storing instructions;
the one or more processors executing the instructions to:
receive images recorded by a forward facing camera mounted to a remotely controlled aerial vehicle;
receive sensor data detected by another forward facing sensor mounted to the remotely controlled aerial vehicle and co-located with the forward facing camera;
superimpose the sensor data onto the received images to transform the received images and the sensor data into an augmented forward looking view from the perspective of the remotely controlled aerial vehicle;
display the augmented forward looking view to an operator of the remotely controlled aerial vehicle at a display device; and
send instructions instructing the remotely operated aerial vehicle to change orientation based on an object displayed in the augmented forward looking view.

12. The system of claim 11, wherein the one or more processors executing the instructions to receive sensor data detected by another forward facing sensor comprises the one or more processors executing the instructions to receive radar returns detected by a co-located forward facing radar unit; and wherein the one or more processors executing the instructions to superimpose the sensor data onto the received images comprises the one or more processors executing the instructions to augment the received images with the received radar returns.

13. The system of claim 11, wherein the one or more processors executing the instructions to receive sensor data detected by another forward facing sensor comprises the one or more processors executing the instructions to receive lidar returns detected by a co-located forward facing lidar unit; and wherein the one or more processors executing the instructions to superimpose the sensor data onto the received images comprises the one or more processors executing the instructions to augment the received images with the received lidar returns.

\* \* \* \* \*